May 20, 1958 A. HEETMAN 2,835,740
ARRANGEMENT OF SUBSCRIBER'S LINE CIRCUITS
Filed Feb. 18, 1955
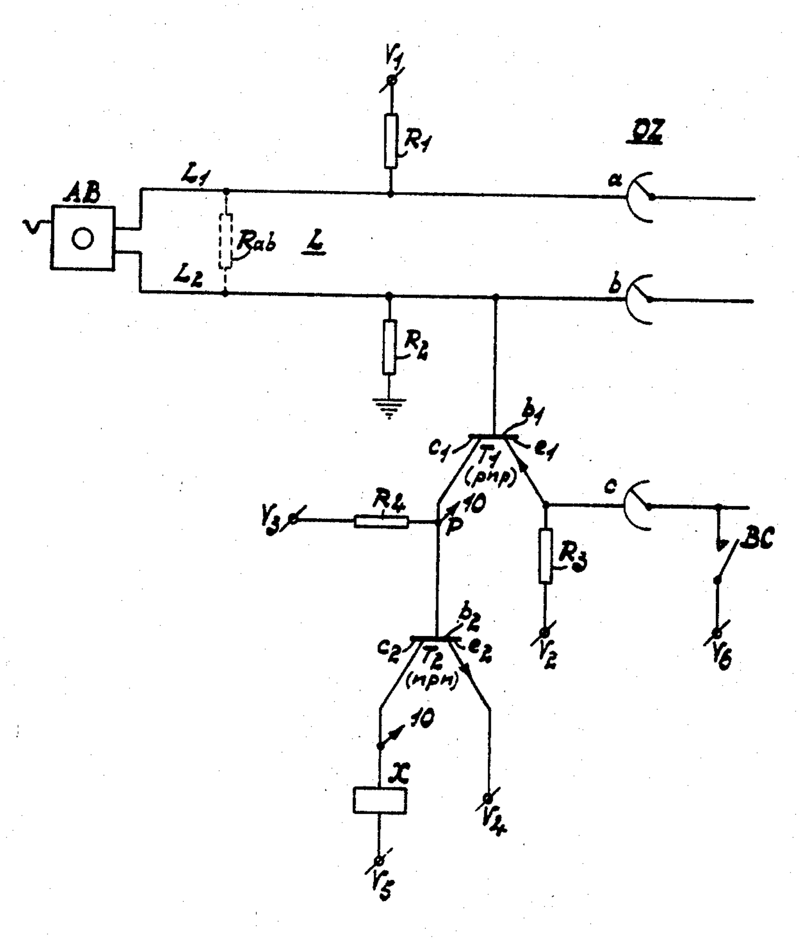
INVENTOR
ALPHONSUS HEETMAN
BY Fred M. Vogel
AGENT United States Patent Office 2,835,740
Patented May 20, 1958

2,835,740

ARRANGEMENT OF SUBSCRIBER'S LINE CIRCUITS

Alphonsus Heetman, Hilversum, Netherlands, assignor, by mesne assignments, to North American Philips Company, Inc., New York, N. Y., a corporation of Delaware Application February 18, 1955, Serial No. 489,123

Claims priority, application Netherlands February 26, 1954

2 Claims. (Cl. 179—18)

This invention relates to arrangements of subscriber's line circuits in automatic telephone exchanges.

A circuit arrangement of this kind is already known in which the wires of the subscriber's line are connected to outlet contacts of a plurality of line finders and connected by way of resistors to different poles of a source of supply, one line wire being coupled to a device reacting upon calling (line detector) and to a marking contact of the relative outlet of the line finders.

In known arrangements the marking contact of the line finders is connected by way of a resistor to the said line wire and coupled by way of a rectifier to the line detector. Said rectifier is cut off in the rest position of the arrangement. Upon calling, the potential of the second line wire varies as a result of closure of the line loop in such manner that the rectifier becomes conducting and the line detector is actuated for operating one of the line finders for finding the calling line, whilst the marking contact assumes a potential such that the line is marked as calling. In the talking condition of the line, a potential is applied to the marking contact such that the rectifier is blocked and the outlet is marked as busy.

The known arrangement has the disadvantage that the current which may be supplied to the line detector is comparatively small due to its being limited by the presence of the said resistors which must have comparatively high values, since otherwise the speech currents would be unduly damped.

A second disadvantage is that during the calling position two line circuits are interconnected via the line detector, so that cross-talk might occur.

The present invention mitigates the said disadvantages. The circuit arrangement according to the invention comprises a transistor containing a base, an emitter and a collector, which are connected to a line finder, the marking contact of the line finders and the line detector, respectively. The emitter and the collector are also connected by way of resistors to sources of voltage such that the transistor is not conducting if the wires of the subscriber's line are relatively insulated in the rest position and the transistor becomes conducting if the wires are interconnected upon calling, whilst in the talking condition of the line a voltage is applied to the marking contact such that the transistor is blocked. This circuit arrangement affords the advantage that the marking voltage within wide limits is independent of the leakage between the wires of the subscriber's line.

In order that the invention may be readily carried into effect, it will now be described with reference to the accompanying drawing showing by way of example, one embodiment thereof.

The wires L1 and L2 of a subscriber's line L are connected, on the one hand, to the subscriber's telephone set AB and, on the other, to outlet contacts *a* and *b* of a group of line finders OZ, only one of which is shown. The wire L1 is connected by way of a resistor R1 to a voltage source V1 having a potential of, for example, −60 volts. The wire L2 is connected to earth by way of a resistor R2 and coupled to the base *b1* of a transistor T1, which is of the p-n-p type. The emitter *e1* of transistor T1 is connected to a marking contact *c* of the line finders OZ and connected by way of a resistor R3 to a voltage source V2 having a potential of, for example, −20 volts. The collector *c1* of the transistor T1 is connected by way of multiple point P and a resistor R4 to a voltage source V3 having a potential of, for example, −40 volts. The voltage sources V2 and V3 have negative potentials with respect to earth, so that the transistor T1 is cut off in the rest position of the arrangement. The multiple point P is multipled in a similar manner to the collector *c1* of transistor T1 associated with nine other subscriber's line circuits of the group. The multiple point P is also connected to the base *b2* of a transistor T2, which is of the n-p-n-type. The emitter *e2* of transistor T2 is connected to a voltage source V4 having a voltage of, for example, −35 volts, the collectors *c2* being connected by way of the winding of a relay X to a voltage source V5, for example to earth. The voltage of the voltage sources V4 and V5 is higher than that of source V3, so that transistor T2 normally is cut off and relay X is not energized.

The circuit arrangement operates as follows: In the rest position of the circuit the loop across the line wires L1 and L2 and the subscriber's telephone set AB is open. However, in practice a certain leakage always occurs between the line wires L1 and L2, which leakage is represented symbolically by a resistor R*ab*, so that the potential of the line wire L1 is not equal to earth potential, but is somewhat lower. In known circuit arrangements in which the line wire is connected by way of a resistor to the marking contact of the line finders this involves the disadvantage that the marking voltage applied to the said contact is influenced by the extent of the leakage R*ab* of the line, so that a well-defined boundary between the marking voltage in the rest position and that in the calling position of the line does not exist. As mentioned before, transistor T1 is cut off in the rest position, so that the marking voltage of marking contact *c* is equal to that of the source V2 and hence within very wide limits independent of the leakage of the line.

When the receiver is removed for calling, a circuit is established extending from the voltage source V1 via resistor R1, line wire L1, telephone set AB, line wire L2 and resistor R2 to earth. The resistors R1 and R2 are identical, so that the line wire L2 can assume a potential of about −30 volts with respect to earth. The potential of the base *b1* then becomes negative with respect to that of the emitter *e1*, so that transistor T1 becomes conducting and currents start to flow from voltage source V2 via resistor R3, emitter *e1*, base *b1*, collector *c1* and resistor R4 to the voltage source V3. Said current has a strength which is many times greater, for example 300 times greater, than the current flowing between the line wire L2 and base *b1*. As a result of the voltage drop across resistor R3, the voltage of marking contact *c* decreases to about −30 volts, so that the line is marked as calling. Due to the increase in potential of collector *c1* and hence of the base *b2* of transistor T2, this transistor becomes conducting and current starts to flow from voltage source V5 via the winding of relay X, collector *c2*, base *b2* and emitter *e2* to the voltage source V4. The relay X in this circuit is energised, thus actuating a line finder OZ for finding the calling line in a manner which is known per se and thus not shown. The line finder tests the voltage of the *c*-contacts and comes to a standstill when the calling line has been found, whereupon the *c*-wiper is connected to a voltage source V6 by way of contact BC of a relay (not shown).

The voltage of voltage source V6 is lower than the lowest voltage which the wire L2 can assume, so that the emitter *e*1 acquires a potential lower than that of base *b*1 and transistor T1 is again cut off. The subscriber's line is now marked as busy. The busy-marking voltage is lower than the marking voltage if the line is at rest, and also lower than that in the calling position, so that a final selector testing the *c*-contact concerned can find a difference between the rest position, on the one hand, and the busy-position or calling position, on the other. Due to the decrease in the potential of the base *b*2 of transistor T2, the latter transistor is also cut off and relay X is released, unless another call is present. If a final selector occupies the line concerned, the *c*-marking contact has applied to it a voltage such, for example the voltage V6, that transistor T1 cannot become conducting and hence the line detector cannot become operative when the call is answered by the called subscriber.

It is noted that the potential of the marking contact *c* in the calling position of the line is located between that in the free position and that in the busy position. The test device controlling the line finder OZ is thus required to be so arranged that it is reactive, if the marking voltage is located within the range corresponding to the calling position, and is not reactive, if the marking voltage has a higher or lower value. Arrangements suitable for this purpose are known per se.

The test device of the final selector is preferably so arranged that it is reactive only if the marking voltage is equal to that corresponding to the free position, and is not reactive if the marking voltage has a lower value, so that a final selector cannot occupy a calling line.

The voltage V6 which is applied to the marketing contact *c* in the busy position of the line, may, if desired, have different discrete values depending upon a local conversation or a trunk conversation being held.

What is claimed is:

1. A telephone system comprising a two-wire subscriber's line, a subscriber station connected to close said line by short-circuiting it when placing a call, a two-terminal first source of voltage, two resistors connected respectively between said wires and said terminals, a three-section line finder having outlet contacts of two sections connected respectively to said wires, the third said section having a marking contact, a line detector circuit for actuating said line finder, a transistor having a base connected to one of said wires, an emitter connected to said marking contact, and a collector connected to said line detector circuit, a second source of voltage, a resistor connected between said collector and second source of voltage, a third source of voltage, a resistor connected between said emitter and said third source of voltage, and a fourth source of voltage connected to the wiper arm of said third line-finder section, said first, second and third sources of voltage having relative voltage values to render said transistor normally non-conducting when said line is open and conducting when said line is closed to place a call, and said fourth source of voltage having a value to render said transistor non-conducting when said wiper arm connects with said marketing contact.

2. A telephone system as claimed in claim 1, in which said line detector circuit comprises a relay connected to actuate said line finder, a fifth source of voltage, and a transistor having a base connected to the collector of the first-named transistor, a collector connected to said relay, and an emitter connected to said fifth source of voltage.

References Cited in the file of this patent

UNITED STATES PATENTS

| | | |
|---|---|---|
| 2,676,210 | Oberman et al. | Apr. 20, 1954 |
| 2,676,211 | Buchner | Apr. 20, 1954 |
| 2,714,629 | Oberman | Aug. 2, 1955 |